United States Patent [19]

Hirooka et al.

[11] Patent Number: 4,566,032
[45] Date of Patent: Jan. 21, 1986

[54] VISUALLY GUIDED VEHICLE

[75] Inventors: Shigeru Hirooka; Shuichi Maeda; Shigehiro Yamamoto; Toshihiko Yamaguchi, all of Kyoto, Japan

[73] Assignees: Nippon Yusoki Co., Ltd.; Dac Engineering Co., Ltd., both of Kyoto, Japan

[21] Appl. No.: 550,690

[22] Filed: Nov. 10, 1983

[30] Foreign Application Priority Data

Dec. 20, 1982 [JP] Japan .................................. 57-223516

[51] Int. Cl.⁴ .............................................. H06N 7/18
[52] U.S. Cl. ..................................... 358/103; 180/168; 180/169; 364/424
[58] Field of Search ................ 358/103, 108; 364/424, 364/426; 180/169, 168

[56] References Cited

U.S. PATENT DOCUMENTS 3,612,764 10/1971 Gilkeson .............................. 358/108
4,278,142 7/1981 Kono .................................... 180/168

Primary Examiner—Howard W. Britton
Attorney, Agent, or Firm—Sughrue, Mion, Zinn, Macpeak & Seas

[57] ABSTRACT

An optically guided, unmanned, load transporting vehicle, such as a fork-lift truck, includes an electric camera, such as an industrial television camera, and a controller for controlling the automatic running apparatus of the vehicle. Two reflectors are disposed in front of the camera so that the camera receives light from remote and near visual fields. A guide belt laid on floor for guiding the vehicle is formed with various bar codes representing halt, acceleration, deceleration, etc.

5 Claims, 40 Drawing Figures

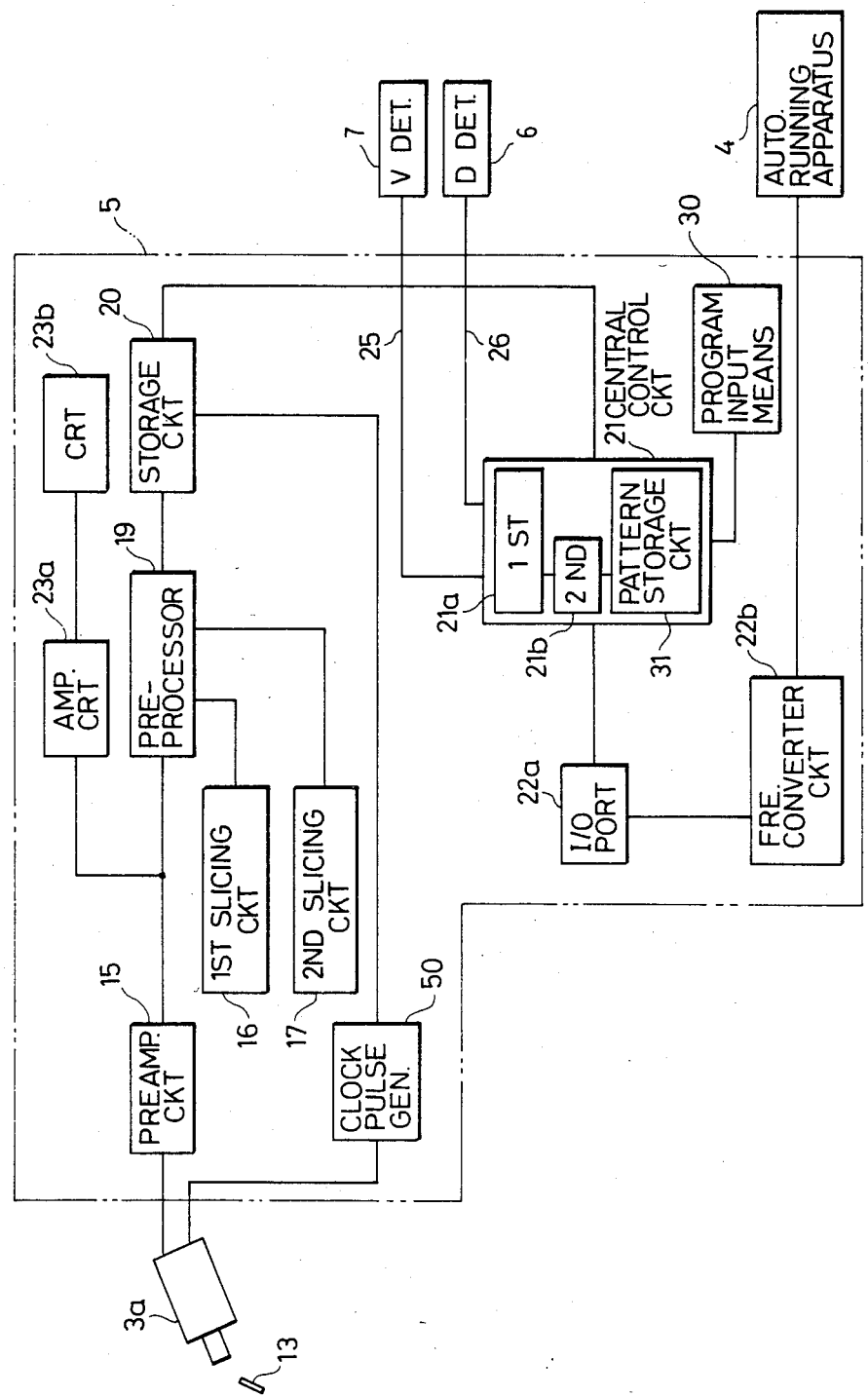

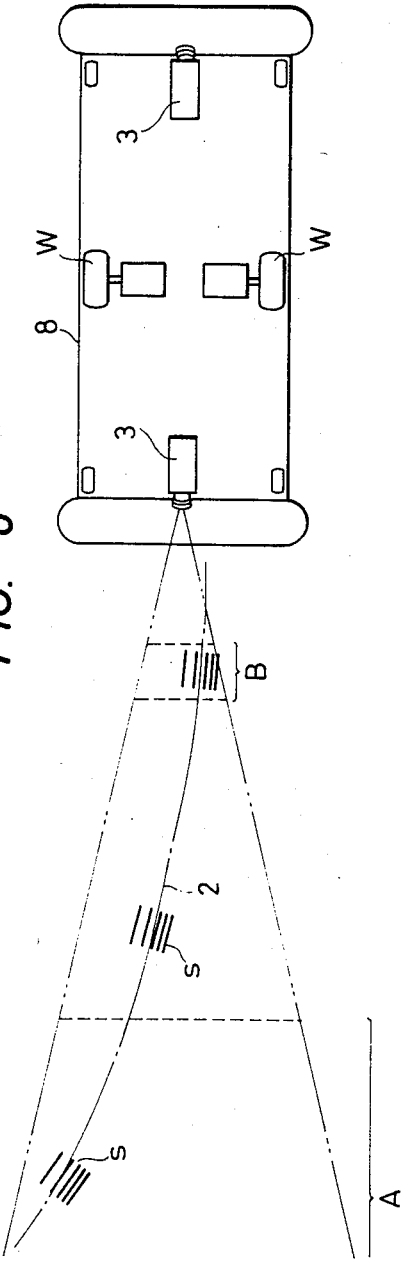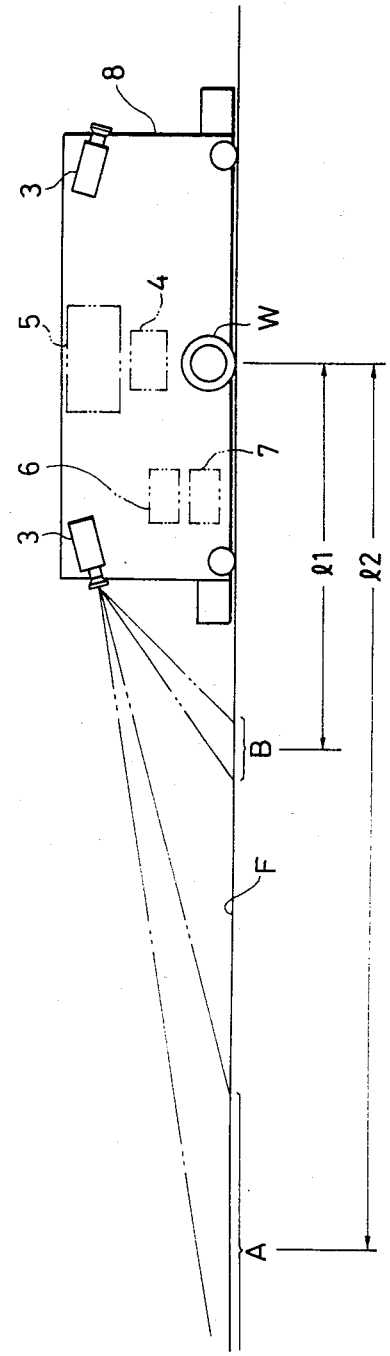
FIG. 8
FIG. 9

| | BAR CODE | MEANING |
|---|---|---|
| a | ‖‖‖ | STRAIGHT ADVANCE |
| b | ❘ ❘❘ ❘ | DECELERATION |
| c | ❘❘❘ ❘ | TURNING TO THE RIGHT |
| d | ❘ ❘❘❘ | TURNING TO THE LEFT |

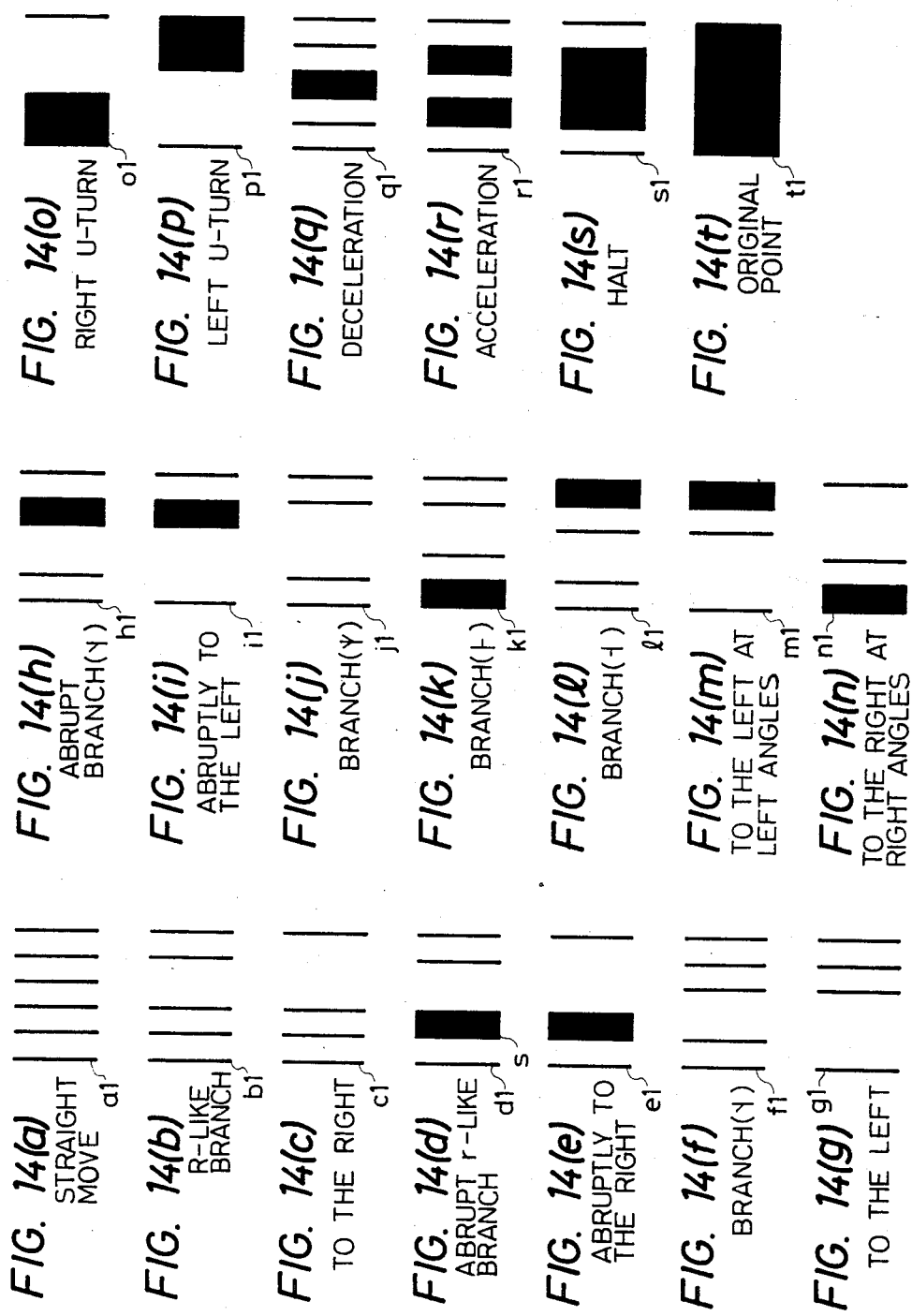

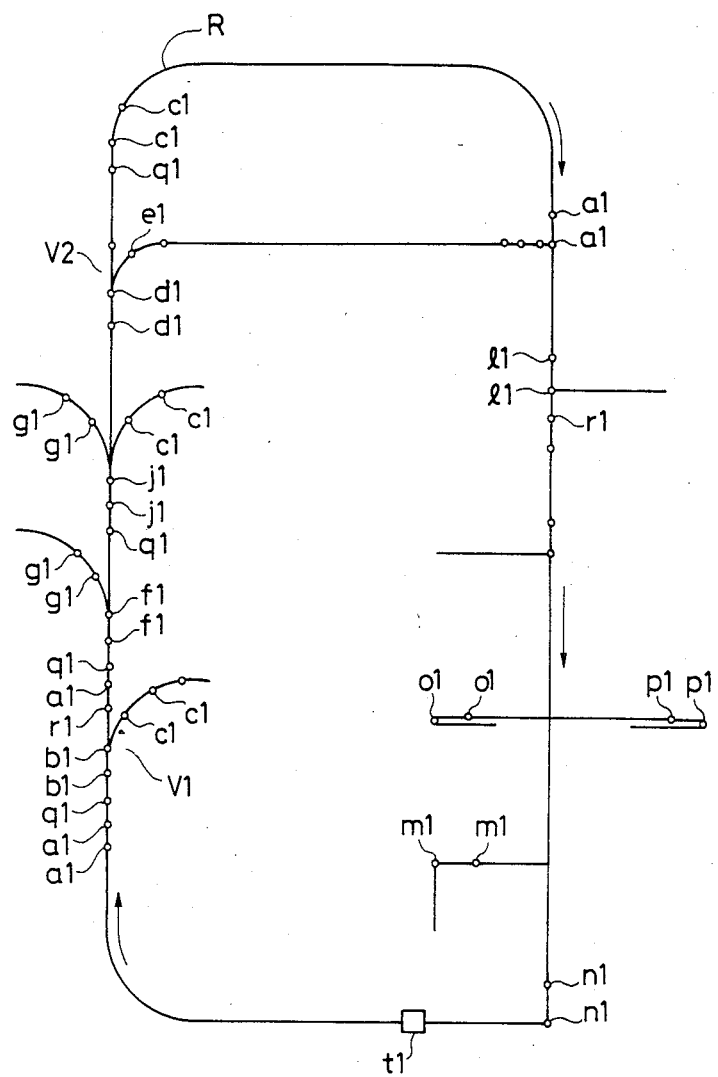

VISUALLY GUIDED VEHICLE

BACKGROUND OF THE INVENTION

The present invention relates to an optically guided, unmanned or driverless load transporting vehicle. More particularly, the invention relates to such a load transporting vehicle which employs a camera tube such as an industrial television camera, can be automatically controlled, that is, automatically steered, run and stopped, and which can be readily introduced into even an existing factory, or the like, and which has a novel means for detecting a guide belt.

Conventionally, in order to run an unmanned lifting truck such as a fork-lift truck having prongs which can be raised or lowered, often a guide line, which radiates a guiding signal, has been buried in the floor of the facility where it is to be used. A pair of pickup coils is then installed on the body of the truck such that the guide line is interposed between the pickup coils. A voltage difference induced between the coils is detected to control the truck. Usually, such a guide line is either received in a groove formed in the floor or buried in the floor. Installation in the former arrangement is difficult, while the latter requires a large number of steps, including forming a groove in the floor of an already-constructed building. Further, in the case of a relatively thin concrete floor as may be encountered above the ground level, it is difficult to form such a groove. Another problem is that steel bars embedded in the concrete work may emit a secondary electromagnetic radiation which disturbs the control signal. Also, if the line is broken, the whole running course may be made useless. Further, in a nuclear power plant, due to the possibility of radioactive waste accumulating in a groove, a grooved track may not be possible.

Further, radio control of vehicles is known, but such systems are readily affected by noise.

It is also known to embed a magnet or similar means in the floor at junctions or the like. This technique is, however, accompanied by difficulties similar to those encountered in case of the induction lines buried in a recess in the floor.

Optical guide systems are also known in which geometrical patterns, such as triangles and circles, are provided on the floor to control unmanned trucks. Unfortunately, it takes a computer a long time to recognize the patterns. Further, the number of such patterns is limited, thus providing only a limited quantity of information which may be used for control, resulting in poor responsiveness in the system.

In view of the foregoing difficulties, it is a main object of the present invention to provide an unmanned load transporting vehicle which dispenses with the formation of grooves or recesses in floor.

It is another object of the invention to provide an unmanned load transporting vehicle which can be run with higher certainty and accuracy than is possible with conventional approaches.

SUMMARY OF THE INVENTION

In accordance with the invention, there is provided a guide belt for an unmanned load transporting vehicle that includes various bar codes. Each bar code has an assigned meaning, included among which are halt, deceleration, acceleration, turning, etc.

The bars of the bar codes may be formed with reflecting material. A camera tube receives light reflected from the guide belt, and a controller controls an automatic running apparatus in response thereto. In accordance with one aspect of the invention, the aforementioned camera tube is so constructed as to receive light reflected from respective remote and near visual fields, thereby attaining certain and accurate automatic control.

These and other objects and features of the invention will appear in the course of the description thereof which follows.

BRIEF DESCRIPTION OF THE DRAWINGS

FIG. 4 is a block diagram of the controller in the vehicle of FIG. 1;

FIG. 8 is a plan view of another unmanned load transporting vehicle according to the invention;

FIG. 9 is a front elevation of the vehicle of FIG. 8;

FIGS. 14(a)-14(t) illustrate other examples of bar codes; and

FIG. 15 shows a vehicle course formed with bar codes.

DESCRIPTION OF THE PREFERRED EMBODIMENTS

Figure 1:
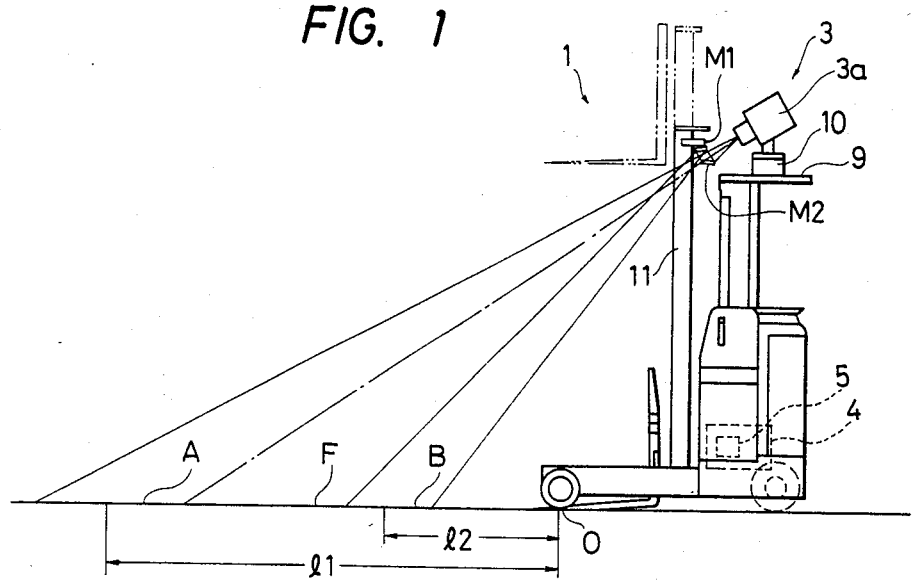
FIG. 1 is a plan view of an unmanned vehicle embodying the present invention.
Figure 2:
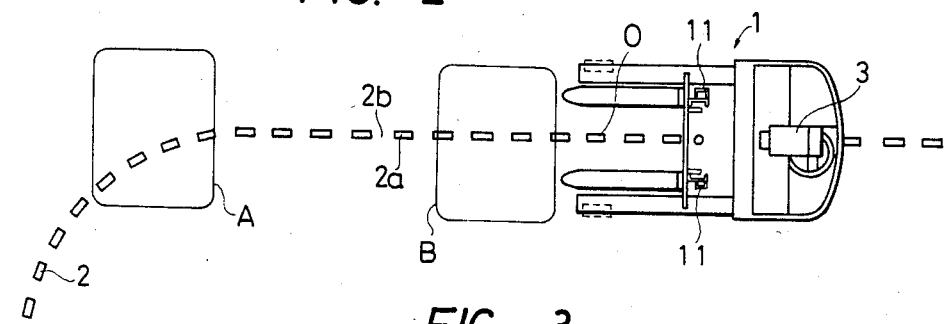
FIG. 2 is a front elevation of the vehicle of FIG. 1.

Referring first to FIGS. 1-4, there is shown a lifting truck 1 which takes the form of a so-called reach-type forklift truck. The truck 1 includes a pickup tube or electronic camera 3 capable of receiving light reflected from a guide belt 2 composed of reflectors laid on a floor F, and a controller 5 for controlling an automatic steeering apparatus 4. First and second reflectors M1 and M2, respectively, are installed in front of the camera 3 for obtaining near visual field information. In this example of the present invention, the truck further includes a detector 7, for detecting the distance moved, and a velocity detector 6.

The guide belt 2 is composed of a reflecting material, such as a reflecting sheet into which beads or the like are mixed, reflecting or luminous paint, a metal belt, or any suitable material capable of reflecting natural light, light emitted by the room light, or light from a projector which is mounted on the truck 1. The belt has a width on the order of 3 to 6 cm, and is laid along the course for the truck 1 and is attached to the floor by an adhesive or the like. The guide belt 2 has straight portions and curved portions, each of the curved portions being formed into a belt. Each of the straight portions has long pieces 2a which have a length of about 20 to 50 cm which are spaced apart by spaces 2b having a length substantially equal to or less than that of the long pieces.

Alternatively, the spaces may be omitted to make the belt 2 continuous. Further, it is possible to form dark portions, for example, on both sides of the belt 2 to increase the contrast ratio. In addition, a protruding portion 2d may be formed in each long piece 2a.

Figure 5A:
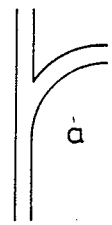
FIGS. 5(a)-5(c) schematically depict guide belts.
Figure 5B:
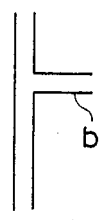
Figure 5C:
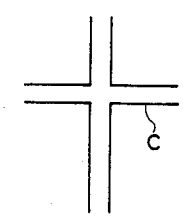

As shown in FIG. 5(a), the belt 2 has an intersection from which a lane curvilinearly branches off so as to form an r-shaped guide belt portion a. The belt has another intersection from which a lane branches off while forming a right-angled guide belt portion b as shown in FIG. 5(b). Further, as shown in FIG. 5(c), the belt includes an intersection from which opposite guide belt portions c extend such that a crossing is formed. In this way, the guide belt 2 can have various lanes, including a plurality of forks and intersections.

The aformentioned camera 3 is mounted on a pedestal 10 located on the head guide 9 in the driver's cab and receives reflected light which passes between polls 11. The camera tube 3 takes the form of an ITV (Industrial Television) camera 3a in the following description, although a vidicon, a Plumbicon, or the like may equally be used as the camera.

Figure 3:
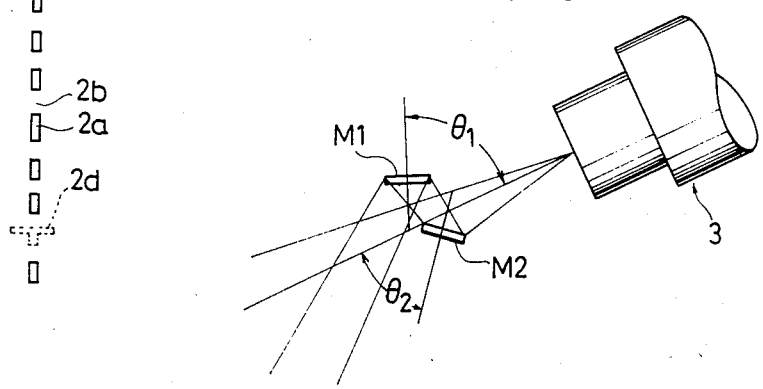
FIG. 3 is a schematic front elevation of a camera shown in FIG. 1 showing the manner in which the camera is installed.

In the relative positions shown in FIG. 3, the first reflector M1 is disposed at an angle of $\theta 1$ outwardly from the central optical axis in front of the pickup tube 3, lying outside, for example above, the beam flux of the reflected light received by the tube 3. The second reflector M2 is disposed within the lower half of the beam flux of the central optical axis, and is arranged at an angle of $\theta 2$ inwardly of the central optical axis. The angle $\theta 2$ is an acute angle smaller than the angle $\theta 1$ ($\theta 1 > \theta 2$). Thus, light reflected from the first reflector M1 can be transmitted to the camera 3 via the second reflector M2. As a result, the camera 3 receives remote visual field information, in the direction of the central optical axis, by a beam flux above the central optical axis. On the other hand, near visual field information is transmitted to the camera 3 from the first reflector M1 via the second reflector M2 by means of the lower half of the beam flux.

The above-mentioned controller 5 processes the electric signal supplied by the ITV camera 3a, and, in response thereto, produces a control signal which is applied to the automatic steering and control apparatus 4. In this specific example, the controller 5 functions to control the deviation d from the guide belt 2 to the center of the truck and the deviation angle $\phi$. More specifically, a representation of the pattern of the guide belt portions a, b and c (see FIGS. 5(a)–(c)) is stored in advance in the controllers. The controller 5 compares the signal produced by the camera 3a with the stored patterns, distinguishing between the various patterns as they are detected, and accordingly controls the truck 1 smoothly and correctly to direct it toward a desired branch.

Referring specifically to FIG. 4, the controller 5 includes a preamplifier circuit 15 for amplifying the signal obtained by conversion of the visual image from the camera 3a, a preprocessing circuit 19, a temporary storage circuit 20 implemented with a shift register, and a central control circuit 21. A first reference circuit 16, which sets the minimum value of the difference between the brightness on the floor F and the brightness on the guide belt 2, that is, the difference between corresponding electric signal levels for reference purposes, is connected to the preprocessing circuit 19. Also connected to the circuit 19 is a second reference circuit 17 for filtering out undesired light rays and setting the maximum value of the difference between those voltages.

The preprocessing circuit 19 binary codes the input signal thereto in accordance with the voltages set by the reference circuits 16 and 17. The output signal from the central control circuit 21 is fed to the automatic steering and control apparatus 4 via an I/O port 22a and a frequency converter circuit 22b. A cathode-ray tube 23b is connected to the output of an amplifier circuit 23a, the input of which is supplied by the preamplifier circuit 15 to thus allow an operator to monitor the picture images received by the camera 3a. Transmission lines 25 and 26 are connected to the central control circuit 21 through which are supplied to the circuit 21 various information, including the inclination angle of the camera 3a and hence the distance $l1$ between the center of rotation O of the truck 1 and the center of the remote visual field A and the distance $l2$ between the center O and the center of the near visual field B, plus velocity information derived from the velocity detector 6, and distance information obtained from the distance detector 7.

The central control circuit 21 is also supplied with coefficients concerning the steering angle and the radius of curvature of the turning circle to be executed by the truck, the ratio of the braking distance to the braking force, and other such parameters. The distance traveled is computed by counting the number of long pieces 2a that the vehicle has passed, or, alternately, by integrating the output of a speedometer which measures the speed of the vehicle. In the former case, use of the aforementioned protruding portions 2d will enhance the accuracy. A program input device 30, in the form of a pendant device, magnetic card, plug, keyboard, or the like, is connected to the central control circuit 21 to select a desired lane on which the individual truck 1 is to be run. The central control circuit 21 further includes a first processing circuit 21a, operating in response to the signal from the temporary storage circuit 20, for calculating the above-mentioned deviations d and deviation angle $\phi$ to control the truck, and a second processing circuit 21b which compares the pattern signals previously stored in the pattern storage circuit 31 with the signal from the ITV camera 3a, distinguishes between these signals, and delivers an output to steer the truck correctly and optimally at a predetermined fork in accordance with the rotation signal from the program input device 30. Reference numeral 50 denotes a clock pulse generator for generating a clock signal for synchronizing the camera 3a and the storage circuit 20.

Figure 6:
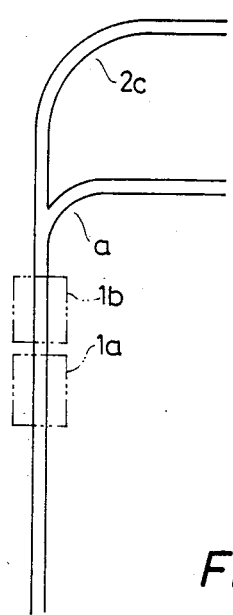
FIG. 6 shows portions of a course for the vehicle.
Figure 7A:
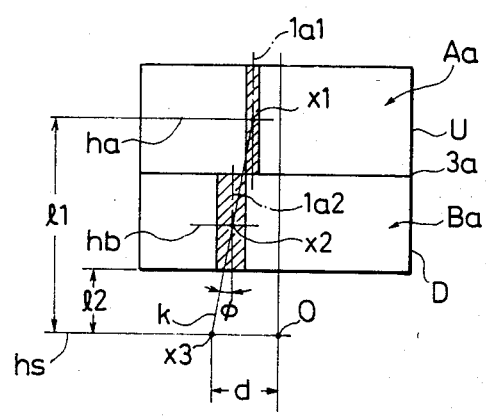
FIGS. 7(a)-7(c) show images obtained by the camera of the vehicle shown in FIG. 1.

Referring next to FIG. 6, a situation is now described in which the truck 1, constructed as described thus far, travels on the lane including the guide belt a and the curved portion 2c extending forwardly from the belt a. When the truck 1 is in the position 1a, reflected light from the remote visual field A and the near visual field B causes the CRT 23b to display visual images Aa and Ba as shown in FIG. 7(a), in such a manner that the image Aa is displayed on the upper half of the screen U of the CRT while the image Ba is displayed on the lower half D of the screen. The signals corresponding to the images Aa and Bb are processed by the first processing circuit 21a so that central line positions 1a1 and 1a2 of the guide belt 2 are detected. Therefore, a point X3, at which the straight line k passing through points X1 and X2 meets the horizontal line hs passing through the center of rotation O of the truck 1, can readily be found. At the points X1 and X2, the central lines 1a1 and 1a2 meet the scanning lines ha and hb, respectively, corresponding to the aforementioned distances $l1$ and $l2$, respectively, on the screen halves U and D. As a result, line segment OX3 can be found as the distance d from the center of rotation O to the guide belt 2, and the inclination of the straight line k can be found as the deviation angle $\phi$. Then, the velocity, the travelling distance, the ratio of the steering angle to the radius of curvature, and other necessary parameters are calculated, and the corresponding output is applied to the automatic steering and control apparatus 4 to correctly guide the truck 1 on the belt 2.

In case where the near visual field B receives light from a point very close to the center of rotation, the distance travelled by the truck 1 can be approximated by the eccentric position of the intersection X2. Also, it is possible to increase the measurement accuracy by scanning at a plurality of positions for each of the visual fields A and B, finding the central positions, and determining the deviation d from the guide belt 2 and the deviation angle $\phi$ for each of the visual fields.

Figure 7B:
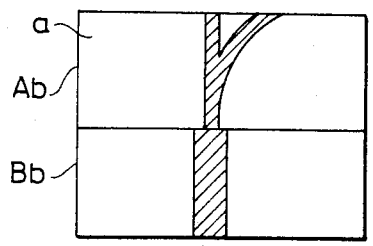
Figure 7C:
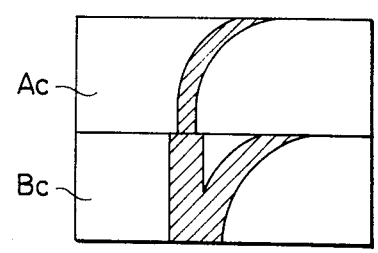

When the truck 1 has arrived at the position 1b, images Ab and Bb shown in FIG. 7(b) are displayed on the upper and lower halves, respectively, of the screen. In the image Ab, corresponding to the remote visual field A, a pattern corresponding to the guide belt 2a appears. For simplicity, the belt 2 is treated as continuous herein. Thus, the second detecting circuit 21b compares this pattern with the patterns stored in the pattern storage circuit 31, and distinguishes these patterns to correctly recognize that it is the guide belt a branching off like a letter "r" at that point. The detecting circuit 21b further compares the information from the camera tube with the information from the program input device 30 and determines whether the truck should move straight or turn. Then, the circuit 21b stores therein the output to be fed to the automatic running apparatus 4. When an image Bc corresponding to the guide belt a appears in the near visual field B while the truck 1 is still advancing, the second processing circuit 21b compares this information with the stored information, arithmetically processes the information, confirms the signal previously obtained from the remote visual field A and previously stored, and then delivers a predetermined output to the automatic steering and control apparatus 4. More specifically, the processing circuit 21b provides a signal to move the truck along a given course correctly and smoothly at the time the center of rotation O reaches a fork.

Next, an image Ac concerning the curve 2c appears on the screen U displaying the remote visual field A. If the curvature of the curve is relatively large, it is possible to run the truck along the belt 2 by detecting the deviations d from the belt 2 to the truck 1 and the deviation angle as shown in FIG. 7(a). On the other hand, if the curvature is small or a branch occurs at a right angle, accurate automatic steering can be attained by comparing the displayed pattern with the patterns already stored in the pattern storage circuit 31, in the same way as for the guide belt portions a–c, and arithmetically processing the pattern. In case where the truck 1 according to the present invention is rotated about the guide belt portion b or c where lanes intersect at right angles, an output signal is simultaneously provided to the automatic steering and control apparatus 4 to reduce the speed of the truck nearly to zero in the vicinity of the fork.

As described above, in the truck according to the invention, first and second reflectors are arranged at given angles to the central optical axis in front of the camera tube which receives light reflected from the guide belt composed of reflecting material and laid on the floor. Therefore, the guide belt can be installed with greater ease than in the case of a conventional control apparatus having pickup coils which detect currents induced between wires embedded in a groove in floor. Further, the guide belt according to the invention can easily be installed in an existing factory. In addition, there is no possibility of electromagnetic interference, whereby accurate unmanned operation can be achieved. Furthermore, since information is derived from two visual fields, the distances and the deviation angle can be accurately detected, and where the guide belt is formed in discrete segments, the two visual fields can furnish reflected light complementarily. Accordingly, it is possible to reduce the whole length of the guide belt and facilitate the installation of the belt.

A further advantage is that it can recognize the near visual field information derived from the vicinity of the truck substantially independently of the size of load on the prongs and stabilize automatic control because the two reflectors are disposed at given angles to the central optical axis in front of the camera tube. The inclination angles of the reflector can be made large compared with the case of using only one reflector. Thereby, the effect of error in the angles of mounting the reflectors can be decreased. The result is that near visual field information can be obtained stably. If the camera tube is installed at a higher position, the angle of inclination of the camera tube relative to the center of rotation is large, so that the effect of error in mounting the reflectors is reduced. Further, the camera tube has less chance of being fouled by dust or the like than in the case where it is installed near the floor. If an ITV camera is used, a wide-range or remote visual field can readily be recognized.

Figures 10, 11:
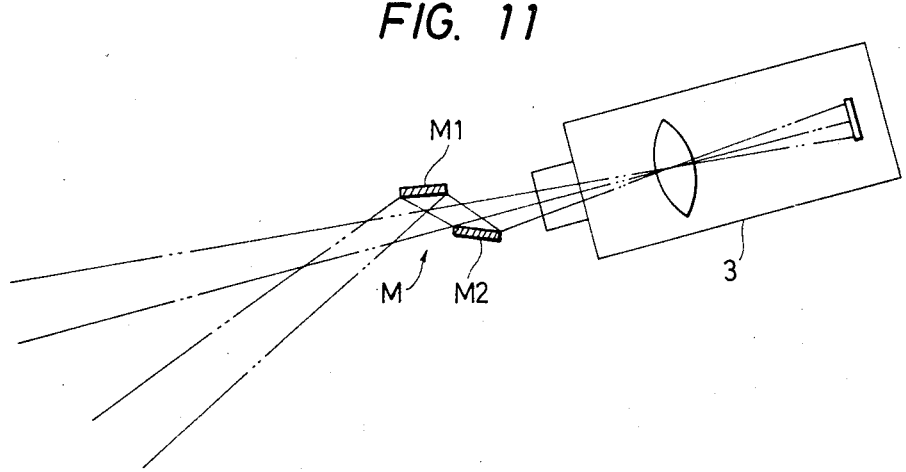
FIG. 10 illustrates examples of bar codes.
FIG. 11 is a fragmentary view of the vehicle of FIG. 8 showing the manner in which the camera is installed.
Figure 12:
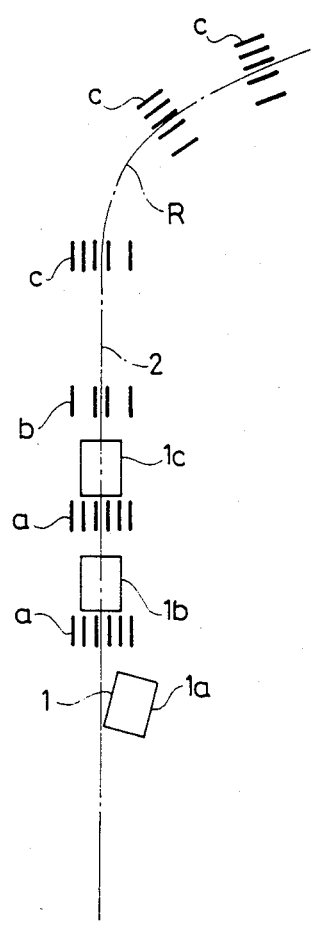
FIG. 12 is a view showing a portion of the course for the vehicle of FIG. 8.

Referring next to FIGS. 8, 9 and 10, there is shown another embodiment of the present invention, in which a guide belt 2 for unmanned load transporting vehicle 8 is made in the form of bar codes.

The body of the vehicle 8 is equipped with a camera tube 3 capable of receiving light reflected from the guide belt 2 laid on the floor, and controller 5 for controlling an automatic steering and control apparatus 4. In this illustrative embodiment, the body of the vehicle further includes a detector 7 for detecting the distance traveled, and a velocity detector 6. The vehicle 8 has a pair of wheels w coupled to its driving source, and is a type of vehicle which is steered by making different the rate of rotation of wheels on opposite sides of the vehicle. The guide belt 2 forms various bar codes, each of which is composed of six bars s, for example. Each bar s is composed of a reflecting material capable of reflecting natural light, artificial light used to illuminate the surrounding area, or light from a projector installed on the vehicle 8 as needed. The bars s have a width of about 12 mm, are appropriately spaced apart, and are attached to the floor.

Several examples of bar codes are shown in FIG. 10, in which six consecutive bars s, pattern (a), represents a straight advance. Pattern (b) having neither a second nor fifth bar represents deceleration. Pattern (c) in which the fifth bar is omitted represents a turn to the right. Pattern (d) in which the second bar is omitted represents a turn to the left. In this way, any desired course pattern for the unmanned vehicle 8 can be obtained by variously combining bar patterns. Although each combination of bars s represents a single piece of information in the foregoing, it is also possible to give a specific meaning to each position of the bars s. Further, the quantity of command information may be increased by varying the width of the bars s or by increasing the number of bars per pattern.

Two camera tubes 3 are installed on the upper ends of the front and back sides of the body of the vehicle to cover forward and rearward movements. As shown in FIG. 11, a reflector M including a first mirror M1 and a second mirror M2, is disposed in front of each tube 3. The first mirror M1 is disposed outside of the beam flux of the reflected light that the tube 3 receives. The second mirror M2 is disposed across the lower half of the beam flux below the central optical axis and directs the light reflected from the first mirror M1 toward the tube 3. Thus, the reflector can receive light from both the remote visual field A and from the near visual field B.

The aforementioned controller 5 processes the signal supplied from either camera 3 (which, as before, may be an ITV camera), and in response produces a control signal, which is applied to the automatic steering and control apparatus 4. In this specific example, the controller 5 functions to control the distance d from the guide belt 2 to the center of rotation of the vehicle and the deviation angle $\phi$. Further, the controller 5, in which are stored in advance the patterns, compares the patterns detected by the ITV camera 3a with the stored patterns, and distinguishes these patterns to steer the vehicle 8 smoothly and correctly and direct it toward a desired branch.

As schematically shown in FIG. 4, the above-mentioned controller 5 includes a preamplifier circuit 15 for amplifying the electric signal obtained upon conversion of the visual image from the camera 3a, a preprocessing circuit 19, a temporary storage circuit 20 such as a shift register, and a central control circuit 21. A first reference circuit 16 sets the minimum value of the difference between the brightness on the floor F and the brightness on the guide belt 2, that is, the difference between corresponding electric signals. The reference circuit 16 is connected to the preprocessing circuit 19, which may be implemented with known digital circuits. Also connected to the circuit 19 is a second reference circuit 17 for filtering out undesired light rays and for setting the maximum value of the difference between the two signals. The preprocessing circuit 19 binary codes the input signal applied thereto in accordance with the minimum and maximum voltages set by the reference circuits 16 and 17. The output signal from the central control circuit 21 is applied to the automatic steering and control apparatus 4 via an I/O port 22a and a frequency converter circuit 22b to control the apparatus 4.

A cathode-ray tube display 23b is driven by an amplifier circuit 23a, which is, in turn, driven by the preamplifier circuit 15. This is done to allow an operator to monitor the received picture images. Transmission lines 25 and 26 are connected to the central control circuit 21 to supply to the circuit 21 various information, including the inclination angle of the camera 3a and hence the distance $l1$ between the center of rotation O of the vehicle 8 and the center of the remote visual field A and the distance $l2$ between the center of rotation O and the center of the near visual field B. The information may also include velocity information derived from the velocity detector 7 and distance information obtained from the distance detector 6. A program input device 30, which may be a pendant drop, magnetic card, plug, keyboard, or the like, is also connected to the central control circuit 21 and is used for selecting a desired lane to be taken by the vehicle 8.

The central control circuit 21 further includes a first processing circuit 21a which, operating in response to signals from the temporary storage circuit 20, calculates the above-mentioned distances d and deviation angle $\phi$ which are used to control the operation of the vehicle, and a second processing circuit 21b which compares the signal from the camera 3a with the bar code patterns stored in the pattern storage circuit 31, distinguishes between these signals, and delivers an output used to steer the vehicle correctly and optimally at a predetermined fork in accordance with the instruction signal from the program input device 30.

The manner in which the above-described unmanned load transporting vehicle 8 is steered through a course having a right curve R in front of the vehicle will next be described with reference to FIGS. 13(a)–13(c).

Figure 13A:
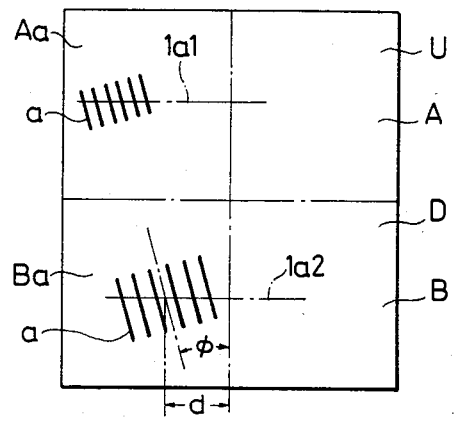
FIGS. 13(a)-13(c) show images obtained from the camera of the vehicle of FIG. 8.

When, for instance, the vehicle 8 is in a position 1a in a straight course and the center line of the body of the vehicle is twisted to the right, the reflected light from the remote visual field A and the near visual field B cause the CRT 23b to display patterns Aa and Ba representing an advance as shown in FIG. 13(a). As above, the upper half U of the screen of the CRT 23b displays the remote visual field A, while the lower half D of the screen displays the near visual field B. The inclinations of the patterns Aa and Ba to the respective center lines 1a1 and 1a2 is detected by scanning these patterns in a multistage manner with the first processing circuit 21a, and processing them. The distance d and the deviation angle $\phi$ are then calculated based on the measured inclination angles and the derived information about the aforementioned distances $l1$ and $l2$. Then, the information regarding the velocity and the distance traveled, the coefficients concerning the steering angle, and other such parameters are calculated to produce an output for the automatic steering and control apparatus 4 to control the relative rates of rotation of the wheels W. Thus, the vehicle 8 is correctly guided along the guide belt 2. The information from the remote pattern image Aa is helpful in updating the results of calculation for the information derived from the near visual field.

Figure 13B:
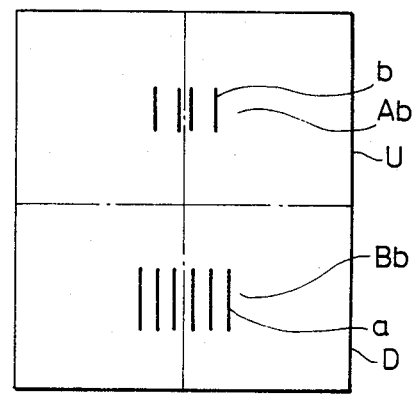

When the vehicle 8 has moved to the position 1b, patterns Aa and Bb shown in FIG. 13(b) are displayed on the upper and lower halves, respectively, of the screen, and a decelerating pattern b appears in the remote visual field A. Then, the second detecting circuit 21b compares this pattern with the patterns stored in the pattern storage circuit 31, discriminates between these patterns, and correctly recognizes that it is the decelerating pattern b. At the same time, the detecting circuit 21b compares that information with the information from the program input circuit 30, discriminates between these pieces of information, and determines an output to be delivered to the automatic steering and control apparatus 4. This output is stored for later transfer to the automatic steering and control apparatus.

Figure 13C:
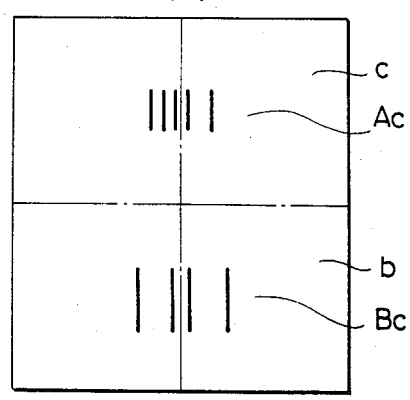

As the vehicle 8 advances further, the decelerating pattern b appears in the near visual field B, and hence the pattern b will appear within the pattern Bc, as shown in FIG. 13(c). At this time, the second processing circuit 21b compares the pattern Bc with the stored patterns, arithmetically processes them, ascertains that the signal which was derived from the remote visual field A and has been already stored, and then provides a predetermined decelerating output to the automatic steering and control apparatus 4 in the same manner as described above. As the vehicle continues to move, the front pattern c indicating turning to the right is processed. As a result, just when, before or after the vehicle arrives at the center of rotation O, a signal is delivered to steer the vehicle along the desired course correctly and smoothly. If the radius of curvature of the curve is relatively large, a pattern will appear on the screen U about the remote visual field A. On the other hand, if the radius of curvature is small or the branch forms a right angle to the main course, no pattern will appear on the screen regarding the remote visual field, thus prompting the operator's attention to the maneuver. Each time that a branch or the like appears along the course, every piece of information obtained is successively compared with the information derived from the program input circuit 30 to appropriately steer the vehicle along the desired course.

Referring next to FIGS. 14(a)–14(t), other examples of bar codes are shown, in which intermediate bars (bars other than the initial and final bars) provide a representation of the path of the vehicle. More specifically, the second and fifth bars represent straight movement, and the third and fourth bars represent curved movement. Further, the width and position of each bar s represent a speed. Pattern al of FIG. 14(a) represents straight movement. Pattern bl of FIG. 14(b), which has a fifth bar but not a fourth bar, represents an r-like branch V1 as shown in FIG. 15. Pattern cl of FIG. 14(c), which does not have the fourth and fifth bars, represents a simple curve R turning to the right without a straight portion. Pattern dl of FIG. 14(d), which has a broad bar s, represents a tight, r-like branch V2. In this fashion, each different bar code is characterized by the positions and the widths of the bars and has a different meaning. The lanes for the vehicle which correspond to the patterns a1–t1 are shown in FIG. 15.

Since the guide belt for the unmanned load transporting vehicle according to the present invention has the form of bar codes composed of segments of reflecting material laid on the floor where the vehicle is to be run, the present system is simpler than other image processing systems, while nevertheless providing a larger quantity of information. At the same time, the quantity of data to be processed by the computer can be reduced, and therefore the time taken to process the data can be shortened, whereby rapid processing is facilitated. Further, because an improved S/N is obtained, the bar codes can be used even if they are incomplete or somewhat dirty. When the novel unmanned load transporting vehicle is used in a flexible manufacturing plant, the plant can readily be modified, thus yielding a practical advantage. When the system is capable of receiving light from both remote and near visual fields in connection with the guide belt according to the present invention, the difference between a pattern obtained from an image in the remote visual field and another pattern obtained subsequently from the same image in the near visual field can be calculated to control the vehicle in a feedback manner, whereby more accurate steering at forks and automatic steering and control are achieved.

We claim:

1. An unmanned load transporting vehicle comprising:
   a guide belt laid on a floor on which said vehicle is run, said guide belt comprising a plurality of reflecting segments comprising a plurality of bar codes representing corresponding instructions including a halt instruction, a deceleration instruction and turning instructions;
   a video camera installed on an upper portion of the vehicle, said camera being directed to receive light reflected from said guide belt;
   controller means installed on the body of the vehicle receiving an output signal from said camera for controlling running of said vehicle in response to said output signal from said camera.

2. The unmanned load transporting vehicle as set forth in claim 1, wherein said camera comprises an industrial television camera.

3. The unmanned load transporting vehicle as set forth in claim 2, wherein said camera comprises a reflector for directing portions of incident light, such that said camera receives reflected light from remote and near visual fields.

4. The unmanned load transporting vehicle as set forth in claim 2, further comprising:
   a first reflector for obtaining near visual field information; and
   a second reflector for transmitting the near visual field information obtained by the first reflector to said camera,
   said first and second reflectors being disposed in front of said camera and at predetermined angles relative to a central axis of said camera.

5. An unmanned load transporting vehicle comprising:
   a guide belt laid on a floor on which said vehicle is run, said guide belt comprising a plurality of bar codes representing corresponding instructions including a halt instruction, a deceleration instruction and turning instructions;
   camera means for detecting said reflecting segments at a first distance from said vehicle, including means for detecting said reflecting segments at a second distance from said vehicle;
   means for recognizing said corresponding instructions upon detection of said reflective segments at said first distance, and storing said instructions; and
   means for recognizing said corresponding instructions upon detection of said reflective segments at said second distance, and acting in accordance with stored instructions, whereby reaction speed of said vehicle is increased.

* * * * *